United States Patent [19]

Humphrey

[11] 4,415,239

[45] Nov. 15, 1983

[54] REFLECTION REJECTION SPHERICAL OPTICAL TRAIN COMPOSED OF TIPPED LENS ELEMENTS

[75] Inventor: William E. Humphrey, San Leandro, Calif.

[73] Assignee: Humphrey Instruments, Inc., San Leandro, Calif.

[21] Appl. No.: 202,534

[22] Filed: Oct. 31, 1980

[51] Int. Cl.³ .................... G02B 13/08; G02B 3/06
[52] U.S. Cl. ..................................... 350/433; 350/420
[58] Field of Search ............... 350/420, 433, 476, 477, 350/478, 436, 447; 355/52; 553/69, 70

[56] References Cited

U.S. PATENT DOCUMENTS

| | | | |
|---|---|---|---|
| 2,821,109 | 1/1958 | Nicoll | 350/443 |
| 2,896,499 | 7/1959 | Leng | 350/447 |
| 3,345,120 | 10/1967 | Palmer | 350/433 |
| 4,218,111 | 8/1980 | Withrington | 350/436 |

FOREIGN PATENT DOCUMENTS

| | | | |
|---|---|---|---|
| 250268 | 7/1926 | United Kingdom | 350/433 |
| 1430903A | 8/1973 | United Kingdom . | |

Primary Examiner—John K. Corbin
Assistant Examiner—Paul M. Dzierzynski
Attorney, Agent, or Firm—Townsend and Townsend

[57] ABSTRACT

A reflection rejecting spherical optical train is disclosed. At least two optical elements each having cylindrical components are disposed along an optical axis. The elements are each crossed one with respect to another so that the total and combined optical output comprises an overall spherical lens. Each of the lens elements having a cylindrical component is tilted with respect to planes normal to the optic axis. Light passing along the optical axis which is reflected at the defined optical interfaces is rejected by the reflection at angles which do not include a return along the optic axis; reflection rejection occurs. Preference is given to a lens train of three or more lens elements having cylindrical components, with the near point of each tilted lens element being located at equal angular intervals about the optic axis. A preferred embodiment is illustrated utilizing three tipped spherical lens elements—typically positive—which with each of these elements having its near point to one end of the lens train spaced at 120° angular intervals about the optic axis.

8 Claims, 11 Drawing Figures

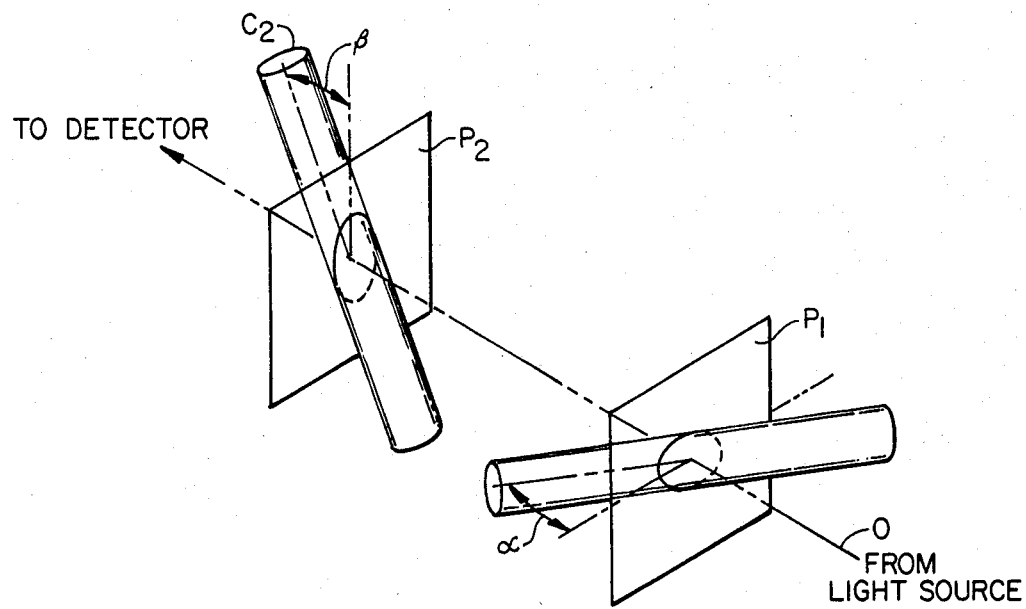
FIG._1A.
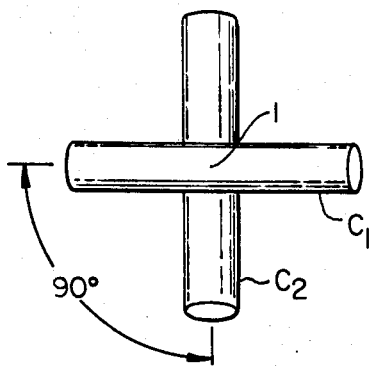
FIG._1B.
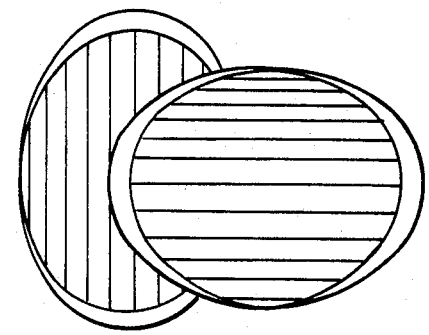
FIG._1D.
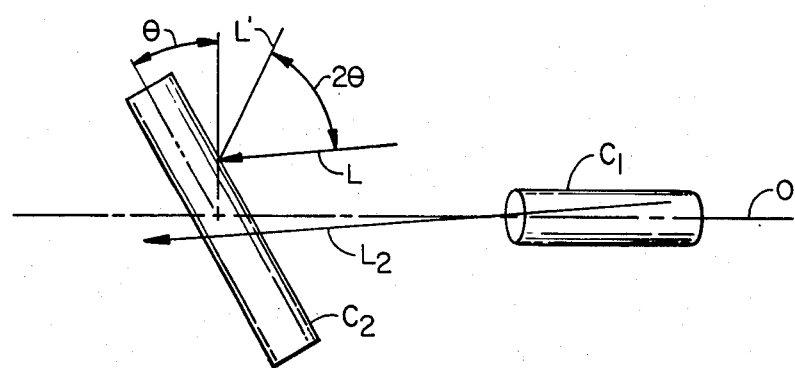
FIG._1C.

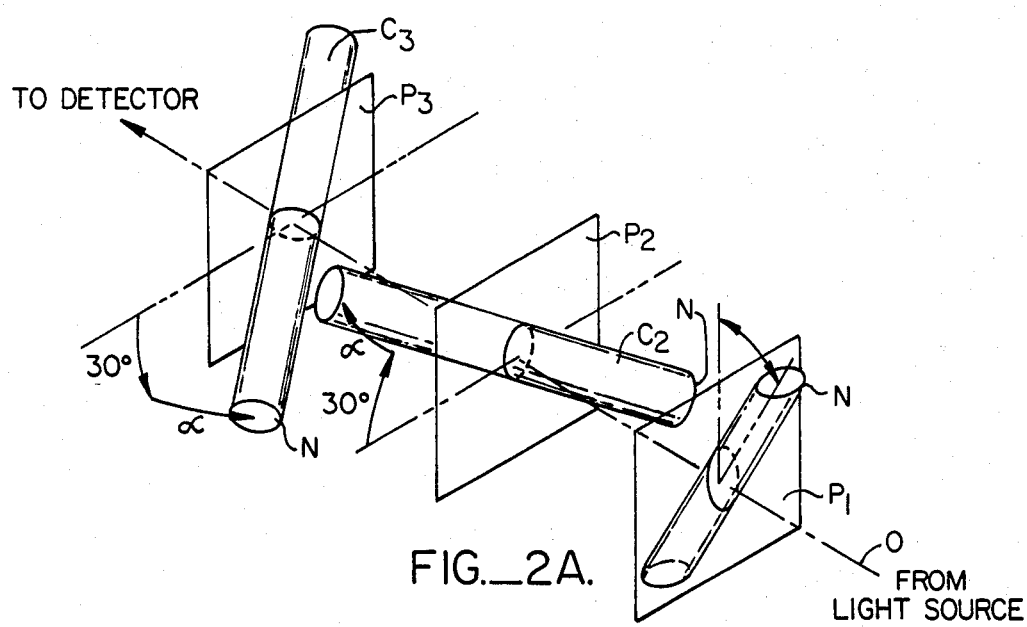
FIG._2A.
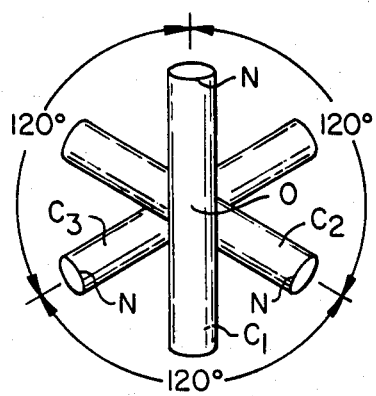
FIG._2B.
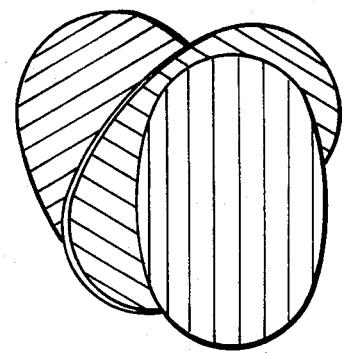
FIG._2D.
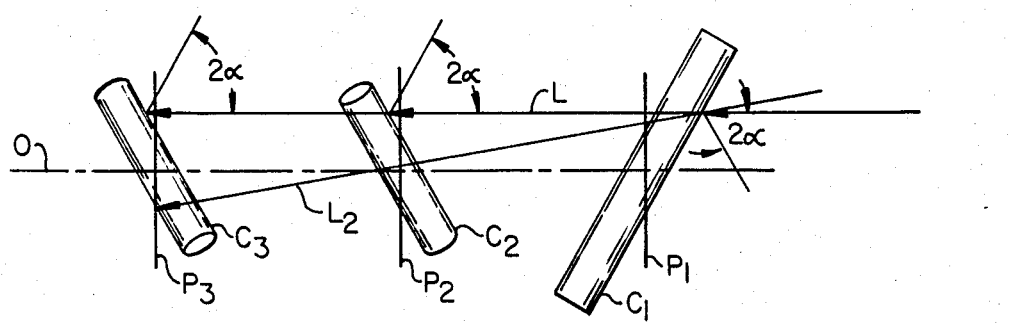
FIG._2C.

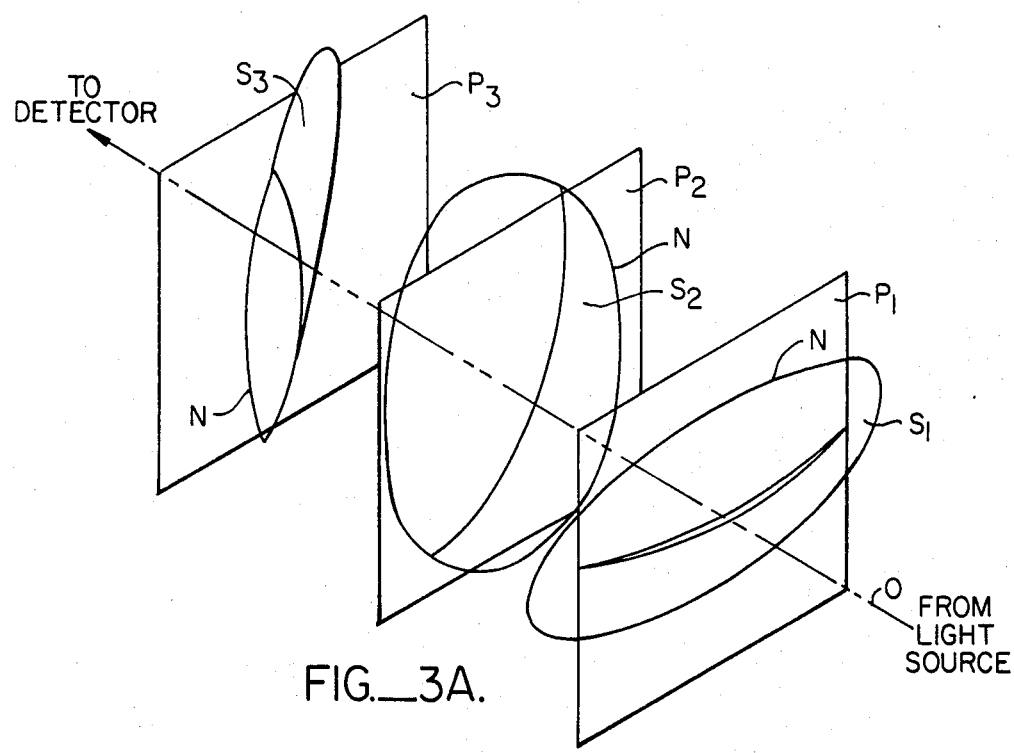
FIG._3A.
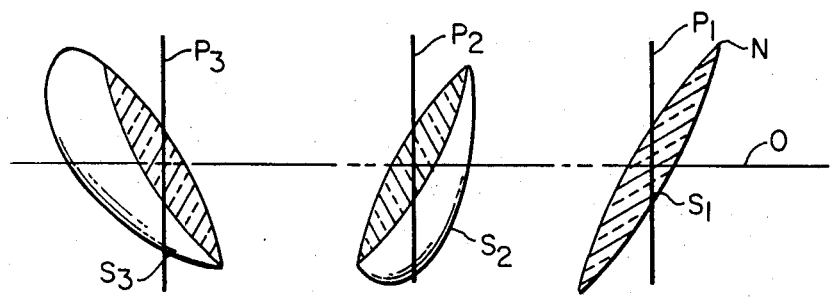
FIG._3B.
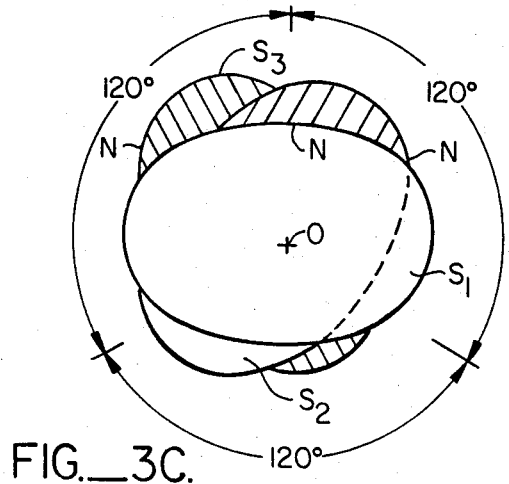
FIG._3C.

REFLECTION REJECTION SPHERICAL OPTICAL TRAIN COMPOSED OF TIPPED LENS ELEMENTS

This invention relates to focusing lens trains and preferably to the reflection rejection spherical lens train composed of a series of at least two optical elements, each optical element having a cylindrical component.

SUMMARY OF THE PRIOR ART

Lens trains having a multiplicity of optical elements have always had reflection problems. Specifically, and at each air glass interface reflections occur. Where such reflections pass axially down the optical path of the lens train or sufficiently close to the optical axis, there results an overall reflective glare.

Prior art solutions to this problem include placing opaque "black bodies" centrally of the lens train. Unfortunately, this leaves a central aperture stop in most lens trains. These central aperture stops can be unacceptable, especially in low light level detectors.

Of recent date, I have developed detectors for low light level images. In the development of such detectors, I have found it highly desirable to have light rejection optical trains such as the ones disclosed herein. See my copending patent application entitled "Objective Refractor for the Eye", Ser. No. 202,536, filed Oct. 31, 1980 on even date with this application.

SUMMARY OF THE INVENTION

A reflection rejecting spherical optical train is disclosed. At least two optical elements each having cylindrical components are disposed along an optical axis. The elements are each crossed one with respect to another so that the total and combined optical output comprises an overall spherical lens. Each of the lens elements having a cylindrical component is tilted with respect to planes normal to the optic axis. Light passing along the optical axis which is reflected at the defined optical interfaces is rejected by the reflection at angles which do not include a return along the optical axis; reflection rejection occurs. Preference is given to a lens train of three or more lens elements having cylindrical components, with the near point of each tilted lens element being located at equal angular intervals about the optical axis. A preferred embodiment is illustrated utilizing three tipped spherical lens elements—typically positive—which with each of these elements having its near point to one end of the lens train spaced at 120° angular intervals about the optic axis.

OTHER OBJECTS AND ADVANTAGES

An object of this invention is to disclose a spherical lens train having the optics therein aligned for light rejection. According to this aspect of the invention, at least two lens elements each having cylindrical components are utilized. The lenses are placed along an optical axis with their respective cylindrical components crossed. The crossing is made so that the cylindrical components together combine to form spherical optics. Each of the lens elements having cylindrical components is tilted with repect to a plane normal to the optical axis. Tilt sufficient to reject light at the air glass interface of the lenses is utilized so that the reflected light is sent out of the optical path of the instrument.

An advantage of this aspect of the invention is that a spherical lens system is disclosed in which light is reflected out of the optical train.

A further advantage of this invention is that concentric light traps within the optical train are not required. The lens train with central stops is not produced. Additional control of reflected light can be achieved by use of anti reflection surface coatings on the elements.

A further object of this invention is to disclose a spherical lens train having at least three tipped optical elements. Each of these elements are disposed along an optic axis with their respective cylindrical components crossed at equal angular intervals. Crossing of the three components enables a spherical lens to be formed. The lens elements as disposed along the optic axis are each tilted with respect to planes normal to the optic axis. The tilting occurs so that each lens define a near point to one end of the optical train. Relative tilting between all three of the optical elements is made so that the respective near points of each lens element are distributed at substantially equal angular intervals about the optic axis.

An advantage of this aspect of the invention is that rays passing through the lens train which are not parallel with the optic axis and intersect the lens train at angles all pass through equal glass thicknesses. Consequently, off axis rays passing through the lens train at varied angularities are all reflected with greater symmetry.

Yet another advantage of this aspect of the invention is that the powers between the cylindrical lens components of each optical train need not be precisely matched. Instead, small rotation of the lens elements one with respect to another will result in a lens train having an overall sphere.

A further advantage of this aspect of the invention is that when all of the elements making up the lens train are composed of cylinders, all air glass interfaces are aligned for rejection light from the optical train.

A further object of this invention is to disclose a spherical lens train having at least three lens elements having cylindrical components wherein each of the elements comprises a spherical lens. According to this aspect of the invention, it will be remembered that spherical lenses can be theoretically described by utilizing two cross cylinders of equal power. Moreover, when a spherical lens is tilted to an alignment other than a normal alignment to an optic axis, there results overall cylinder. By taking three spherical lens elements and tilting the lens elements about an optical axis so that the respective near points of the lens elements to one end of the optical train are distributed at substantially equal angular intervals about the optic axis, there results a preferred lens light rejecting train.

An advantage of this aspect of the invention is that the power of the individual lens elements necessary to form total sphere is small. For example, where a 12 diopter spherical lens is preferred, three tilted lens elements each of four diopters will combine to form the desired total sphere of 12. Contradistinguished from this case, utilizing cylindrical lenses, three tilted cylinder lenses of eight diopters each would be required to form a 12 diopter sphere.

A further advantage of this invention is that the overall optical abberations of the system are reduced. It should be understood, however, that the lens system is by no means perfect; higher order optical abberations will inevitably be present.

Yet another advantage of this aspect of the invention is the effective plane of convergence for lines of differing angularity is effectively the same for tilted spherical lenses. It is not effectively the same for lens trains composed of cylindrical lenses. This common plane of origin for lines of differing angularity is an important distinction making the tilted spherical lens train embodiment preferred.

Other objects, features and advantages of this invention will become more apparent after referring to the following specification and attached drawings in which:

FIG. 1A is a perspective view illustrating an optical light path from a light source to a detector with two cylindrical lenses disposed in the light train;

FIG. 1B is an end view along the optical axis of the embodiment of FIG. 1A;

FIG. 1C is a side elevation of the lens elements in FIG. 1A;

FIG. 1D is a perspective view similar to FIG. 1A illustrating the lens elements without the cylinders being elongate;

FIG. 2A is an embodiment having preference over the embodiments of FIGS. 1A-1C, which includes a perspective view of three optical elements disposed along an optical axis from a light source to a detector;

FIG. 2B is an end view of the perspective view of FIG. 2A;

FIG. 2C is a side elevation view of the view of FIG. 2A;

FIG. 2D is a perspective view similar to FIG. 2A illustrating the lens elements without the cylinders being elongate;

FIG. 3A is a perspective view of a preferred embodiment of this invention illustrating three tipped spherical lenses; and FIG. 3B is a side elevation of the view of FIG. 3A.

Referring to FIGS. 1A, 1B and 1C, the invention herein can now be set forth. Referring to FIG. 1A, an optical axis O is illustrated. Light proceeds from a light source along optical axis O to a detector. Although light is illustrated passing from the light source to the detector, the reader should understand that for the cases herein illustrated, it is not required that light pass in one direction. Light could equally pass in the opposite direction or even be retroreflected.

In FIG. 1A, two lens elements $C_1$ and $C_2$ are illustrated. A discussion of how these lens elements are disposed can be instructive.

First, the lens elements $C_1$ and $C_2$ are shown with an exaggerated and elongate shape. This is done for the purpose of illustrating to the reader the angular disposition of the lens elements. It should be understood that in actual practice the cylindrical lenses would be round and would not have the elonate shape herein shown. (See FIG. 2) However, understanding is greatly facilitated by using such lens shapes.

It is instructive to note that at the position of each of the lens elements having cylindrical components, to wit elements $C_1$ and $C_2$ there can be defined respective planes $P_1$ and $P_2$. Each of these planes is normal to the optic axis O.

The lens elements $C_1$ and $C_2$ are not coplanar in their alignment to planes $P_1$ and $P_2$. Instead, they are tilted by small angles. In the case of lens $C_1$ it is tilted from plane $P_1$ by an angle $\alpha$. In the case of lens $C_2$ it is tilted from plane $P_2$ by an angle $\beta$.

Moreover, it should be understood that the principal axes of each of the cylinders are at precise 90° angles one with respect to another. This much is illustrated in the end view of FIG. 1B. Thus the combined cylindrical elements together wil add at their point of intersection I to form a focusing optic. It should be noted that since principal planes are not flat, a focused image does imply power having a cylinder component.

Referring to FIG. 1C, the light rejection principle on which this invention operates can best be illustrated by observing the light ray L impinging on the air glass interface of element $C_2$. Assuming that the optical elements $C_2$ is tilted with respect to the axis O by an angle $\theta$, it can be seen that a light ray L will be rejected by the air glass interface along a path L'. Reflected path L' will have an alignment to $2\theta$ with respect to incident path L.

Referring to FIG. 1D, a system having cylindrical lenses is illustrated. It is illustrated in the perspective of FIG. 1A, the lens elements here being shown in a perspective view.

It should be understood in the use of the terms "optical elements having a cylindrical component" that these terms are utilized in this application in a general sense. For example, it is known that all lenses having spherical components can be desribed by cross cylinders. That is to say, two or more cylindrical lenses can be crossed at angular intervals to define a spherical lens element. Thus, the term "optical lens elements having cylindrical components" includes spherical lenses.

It should further be understood by the reader that the embodiments of FIGS. 1A-1D are by no means ideal. For example, I have found that the powers of the lens elements $C_1$ and $C_2$ must be precisely balanced at predetermined, differing powers with respect to the chosen focal plane. Thus cylindrical lenses of differing powers producing convergence to the focal plane are required. Where many of the optical elements illustrated in FIG. 1A are produced, requiring cylinders of precise and equal power is not always desirable. Moreover, I have found that in the embodiment of FIGS. 1A-1D precise 90° alignment such as that illustrated in FIG. 1B is required. This again produces practical difficulties in the manufacture of such lens elements.

Further, and assuming a light ray passes through both lens elements on an alignment that is not parallel to the optical axis O, I have found that differing glass thicknesses or wedges are penetrated by the light ray $L_2$. Consequently, distortion and abberations can be introduced. This being the case, it will be understood that the views of FIGS. 1A-1D are not preferred.

I have discovered that by the addition of a third lens element having a cylindrical component that the performance of the reflection rejection light train illustrated in FIGS. 1A-1D can be improved.

Referring to FIG. 2A, an optical axis O is illustrated from a light source to a detector. Three lens elements $C_1$, $C_2$ and $C_3$ are located along the optical axis. These lens elements intersect the optical axis O coincident with the intersection of normal planes $P_1$ for element $C_1$, $P_2$ for element $C_2$ and $P_3$ for element $C_3$.

Referring to FIG. 2B, it can be seen that lens element $C_1$ is aligned vertically. Moreover, it is tilted by an angle Alpha so that the near point N of that lens element is above the optical axis O and disposed to and toward the end of the light train containing the light source.

Optical element $C_2$ is contained in plane $P_2$. It is tilted with respect to the plane $P_2$ so that its mire point N towards the light source is located at an angle of 120° from the mire point N of optical element $C_1$. It is tilted from plane $P_2$ in an angle which is preferably equal to the tip of element $C_1$ with respect to its plane $P_1$ by an angle $\alpha$. Thus, the optical axis of element $C_1$ when projected on the plane $P_1$ forms a vertical line. The optical axis of element $C_2$ when projected onto plane $P_2$ forms a line which is at a 60° angle of intersection with respect to element $C_1$. The respective near points on the lenes are separated one from another by angles of 120°.

The alignment of element $C_3$ with respect to a normal plane to the optic axis O, $P_3$ is analogous. Specifically, element $C_3$ is aligned with its near points N 120° from both the near point N of element $C_1$ and the near point N of element $C_2$. Tilting from plane $P_3$ by an angle $\alpha$ is provided.

Referring to FIG. 2C, the operation of the tilted element to this invention can be easily understood. Specifically, and looking at the path of a light ray L passing along the optic axis, the light rejection can be understood. Specifically, where and wherever light ray L strikes a cylindrical lens element, reflection out of the optical path O occurs. This occurs at least in accordance with an angle to Alpha as illustrated in FIG. 2C.

Referring to FIG. 2D, a lens train forming a cylindrical element is illustrated. Here, however, the lenses are not provided with elongate cylinders for ease of understanding as shown in FIGS. 2A, 2B and 2C.

It will be understood that these respective alignments have advantages not immediately realized in the embodiment of FIGS. 1A–1D. For example, and taking the case of a ray passing along the optical system at an alignment which is other than parallel to the optical axis O (such as ray $L_2$ in FIG. 2C). It will be seen that the lens elements together combine to provide the same amount of deflection to rays $L_2$. In the case of FIG. 2C, it can be seen that the inclination of ray $L_2$ with respect to element $C_1$ the tilt of this optical element. However, and with respect to elements $C_2$ and $C_3$, the degree of tilt of the elements with respect to the light ray is reduced. Thus, it can generally be stated that where alignment of an off axis ray $L_2$ to one element become more critical, it will be generally be improved relative to the following and remaining elements.

Moreover, I have determined that the lens train according to FIGS. 2A–2D is much easier to construct. Specifically, the lens elements $C_1$, $C_2$, and $C_3$ do not have to be precisely matched in power. Moreover, they can be mounted in a common cell and thereafter rotated by a small angle to "match" the lens elements to produce desired optical performance, typically a sharply focused image.

It should be noted that in FIG. 2D the respective near points of all of the lens elements $C_1$–$C_3$ are separated by equal angular intervals. In the embodiment having preference illustrated in FIGS. 2A–2D, this disposition is by no means trivial. In order for off-axis rays to be equally deflected when passing through the aggregate of all lens elements, it is necessary and required that the near points be distributed by the equal angular intervals illustrated herein.

In FIG. 3A the preferred embodiment of this invention is illustrated. Specifically, I include three lens elements having spherical components disposed along an optical axis O. As the lens elements are spherical, they will hereinafter be designated lens element $S_1$, $S_2$ and $S_3$. These lens elements are each tilted with respect to planes. The planes are normal to the optical element O and are designated as planes $P_1$, $P_2$ and $P_3$ as in previous cases.

Each of the lens elements has a near point. Taking the view of FIG. 3C illustrated with vanishing lenses, it will be seen that the near point N of lens $S_1$ is vertically above the optical axis O. The near point N of lens $S_2$ to the light source O is located at 120° interval from the near point N of $S_1$. Likewise, the near point N of $S_3$ is at 120° intervals from both the previously illustrated near points.

It is also known that a spherical lens tilted with respect to an optic axis produces an astigmatic component. Since the produced astigmatic components are at all equal angular intervals, these components will together tend to cancell in their combined effect.

The embodiment illustrated in FIGS. 3A, 3B and 3C has advantages over the purely cylindrical lenses illustrated in FIGS. 1A–1D and 2A–2D.

First, suppose that a 12 diopter lens is desired. In the case of a 12 diopter lens, all three spherical lens elements can be formed of four diopters each. This is to be distinguished from the requirement that three eight diopter cylindrical lenses would be required in the embodiment of FIGS. 2A–2D.

Secondly, the overall optical abberations in the lens system are reduced. For example, the planes of convergence of lines of differing angularities are effectively the same in the optical train of FIG. 3A. They are not effectively the same in the optical train of FIG. 2A.

Regarding FIG. 2A, the angularities of lines having common axial alignments with the cylinders in effect generate from the axis of each of the respective cylinders. Thus, with lines of varying angularity, varying planes of origin coincide to a common focal plane.

The spherical lens embodiment of FIG. 3A has one disadvantage over that of FIG. 2A. Specifically, and with the spherical lens elements of high curvature, there will be points on the lenses which can at certain low angles of tilt reflect light back along the optical train. This is not a desired characteristic.

Accordingly, the tilt of the lens element $S_1$ must preferably be sufficient that all air glass interfaces thereon deflect light out of the optical train. To this extent it will be appreciated that unlike a reflective coating, the invention herein requires that the lens elements each be determined beyond a certain angularity. This angularity can be empirically determined dependent upon the particular lens train utilized and the angle of off-axis light.

What is claimed is:

1. A reflection rejecting focusing optical train, comprising:
   at least two optical elements, each of said optical elements being a cylindrical lens;
   said optical elements disposed along an optical axis;
   the optical elements being crossed one with respect to another so that the total and combined optical power output of all said elements along said axis is equivalent to that of an overall spherical lens;
   each of said optical elements tilted with respect to a plane normal to the optical axis, said tilt disposing the near point of each optical element to one end of said optical train at equal angular intervals about said optical axis with respect to the near point of all the rest of said optical elements, whereby light is reflected out of the optical path of said optical element.

2. The invention of claim 1 and where said optical elements each comprise spherical lenses.

3. The invention of claim 1 and wherein said lens train comprises three optical elements.

4. A reflection rejection spherical optical train, comprising in combination:
   three lens elements, each of said lens elements being a cylindrical lens;
   all of said lens elements being disposed along a common optical axis;
   said lens elements each crossed one with respect to another so that the total and combined optical power output of said lens elements is equivalent to that of an overall spherical lens;
   each lens element being tilted with respect to planes normal to the optical axis, said tilt disposing the near point of each lens element to one end of said optical train at equal angular intervals about said optical axis with respect to the near point of all the rest of said lens elements.

5. The invention of claim 4, wherein said lens elements all comprise positive spherical lenses.

6. The invention of claim 4 and wherein said lens element are each tilted along their axes so that the near point of each of said lens elements is a portion thereof containing an axes of said cylinder.

7. A reflection rejection spherical optical train, comprising in combination:
   at least three lens elements, each of said lens elements being a cylindrical lens;
   all of said lens elements disposed along a common optical axis;
   said lens elements all crossed one with respect to another so that the total and combined optical power output of said lens elements is equivalent to that of an overall focusing lens;
   each of said lens elements being tilted with respect to planes normal to the optic axis, said tilt disposing the near point of each of said lens elements to one end of said optical train at equal angular intervals of said optical axis with respect to the near point of all the rest of said lens elements.

8. The invention of claim 7 and wherein said lens train has only three lens elements and said lens elements all comprise positive spherical lenses.

* * * * *